United States Patent
Higashino et al.

(10) Patent No.: US 6,201,335 B1
(45) Date of Patent: Mar. 13, 2001

(54) ROTOR STRUCTURE

(75) Inventors: Kyoko Higashino; Yoshihito Asao; Kenji Tsuruhara; Atsushi Oohashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,223

(22) Filed: Mar. 20, 2000

(30) Foreign Application Priority Data

Sep. 17, 1999 (JP) .................................................. 11-264130

(51) Int. Cl.[7] .................................................. H02K 21/14
(52) U.S. Cl. ............................ 310/263; 310/156; 310/261
(58) Field of Search .............................. 310/263, 156, 310/257, 192, 261

(56) References Cited

U.S. PATENT DOCUMENTS

| | | | |
|---|---|---|---|
| 5,306,977 | * | 4/1994 | Hayashi et al. ........................ 310/263 |
| 5,483,116 | * | 1/1996 | Kusase et al. ........................ 310/263 |
| 5,747,913 | * | 5/1998 | Amlee et al. ........................ 310/263 |
| 5,903,084 | * | 5/1999 | Asao et al. ........................ 310/263 |

FOREIGN PATENT DOCUMENTS 11-136913    5/1999   (JP) .............................. H02K/19/22

* cited by examiner

Primary Examiner—Burton Mullins
(74) Attorney, Agent, or Firm—Sughrue, Mion, Zinn, Macpeak & Seas, PLLC

(57) ABSTRACT

A rotor structure comprising a rotor coil for generating a magnetic flux, a pole core which covers the rotor coil and consists of a first pole core body and a second pole core body, each having a plurality of claw-like magnetic poles which are mated with each other, magnets provided on both sides of each of the claw-like magnetic pole for suppressing the leakage of a magnetic flux between adjacent claw-like magnetic poles, and reinforcements for holding the magnets in such a manner that the magnets are inclined so that the interval between the magnets becomes larger on the outer side than on the inner side.

This rotor structure can reduce centrifugal force applied to the magnets.

20 Claims, 14 Drawing Sheets

CENTER OF ROTATION AXIS OF ROTOR 7

CENTER OF ROTATION AXIS OF ROTOR 7

B-B CROSS SECTION

A-A CROSS SECTION

C-C CROSS SECTION

A-A CROSS SECTION

CENTER OF ROTATION
AXIS OF ROTOR 7

CENTER OF ROTATION
AXIS OF ROTOR 7

ROTOR STRUCTURE

BACKGROUND OF THE INVENTION

1. Field of the Invention

The present invention relates to a rotor structure for an AC generator or a motor and, particularly, to a structure for attaching magnets for preventing the leakage of a magnetic flux between claw-like magnetic poles.

2. Description of the Prior Art

FIG. 17 is a sectional side view of a prior art rotor structure for an AC generator or a motor, FIG. 18 is a perspective view of the rotor, and FIG. 20 is an exploded side view of individual parts of the rotor.

As shown in FIG. 17, this generator comprises a case 3 consisting of an aluminum front bracket 1 and an aluminum rear bracket 2, a shaft 6 which is installed in the case 2 and one end of which is fitted with a pulley 4, a Randle type rotor 7 fixed to the shaft 6, fans 5 fixed to both end surfaces of the rotor 7, a stator 8 fixed to the inner wall of the case 3, slip rings 9 which are fixed to the other end of the shaft 6 and supply a current to the rotor 7, a pair of brushes 10 in sliding contact with the slip rings 9, a brush holder 11 for storing the brushes 10, a rectifier 12 which is electrically connected to the stator 8 and rectifies an alternating current generated in the stator 8 into a direct current, a heat sink 19 attached to the brush holder 11, and a regulator 20 which is attached to the heat sink 19 and regulates an AC voltage generated in the stator 8.

The rotor 7 comprises a cylindrical rotor coil 13 for generating a magnetic flux with a current and a pole core 14 which covers the rotor coil 13 and forms a magnetic pole with the magnetic flux of the rotor coil 13.

The stator 8 comprises a stator core 15 and a stator coil 16 which is wound round the stator core 15 and generates an alternating current by a change in magnetic flux from the rotor coil 13 caused by the rotation of the rotor 7.

The pole core 14 consists of a first pole core body 21 and a second pole core body 22 which are mated with each other.

The pole core body 21 and the pole core body 22 are generally made from iron and consist of cylindrical portions 21e and 22e wound with the rotor coil 13 and disk-like base portions 21k and 22k from which the cylindrical portions 21e and 22e project, respectively. The base portions 21k and 22k have at the peripheries a plurality of claw-like magnetic poles 23 and 24 which are mated with each other between the outer wall of the rotor coil 13 and the inner wall of the stator 8, respectively.

The thickness and width of each of the claw-like magnetic poles 23 and 24 are large on the base portion 21k and 22k sides and become smaller toward the end sides.

The inner faces 23a and 24a of the claw-like magnetic poles 23 and 24 become thinner toward the ends and the outer faces 23b and 24b are arched in conformity with the inner wall of the stator 8. Each of the claw-like magnetic poles 23 and 24 has two trapezoidal side faces 23c and 24c in a circumferential direction of the rotor 7. Since each pair of claw-like magnetic poles 23 and 24 are mated with each other, the inner faces 23a and 24a of the claw-like magnetic poles 23 and 24 are arranged alternately in a circumferential direction. The side faces 23c and 24c of the claw-like magnetic poles 23 and 24 are inclined toward the centers of the claw-like magnetic poles 23 and 24 so that they become thinner from the root side toward the end side.

As shown in FIG. 18, a rectangular magnet 30A magnetized to suppress the leakage of a magnetic flux between the opposed side faces 23c and 24c is fixed between the adjacent claw-like magnetic poles 23 and 24.

A description is subsequently given of the operation of the generator. A current is supplied from an unshown battery to the rotor coil 13 through the brushes 10 and the slip rings 9 to generate a magnetic flux, whereby the claw-like magnetic poles 23 of the first pole core body 21 are magnetized to an N pole and the claw-like magnetic poles 24 of the second pole core body 22 are magnetized to an S pole. Meanwhile, the pulley 4 is turned by the rotation force of an engine and the rotor 7 is turned by the shaft 6, thereby generating electromotive force in the stator coil 16. This AC electromotive force is rectified into a direct current by the rectifier 12, regulated by the regulator 20 and charged into the unshown battery.

The above magnet 30A which is inserted between the claw-like magnetic poles 23 and 24 and is rectangular or may be various in shape, for example, ring-shaped or ring-shaped and packed in other resin is fixed to the claw-like magnetic poles 23 and 24 by fixing means.

However, the following problems may occur. That is, since stress is applied to the magnet 30A at the time of production or centrifugal force generated by rotation is applied to the magnet 30A, the magnet 30A is inferior in durability.

Further, since the pole core bodies 21 and 22 are generally produced by forging, details of the claw-like magnetic poles 23 and 24 which have a specially complex shape cannot have high accuracy. There are differences in size between the claw-like magnetic poles 23 and 24. It is difficult to manufacture the magnet 30A which is formed in conformity with the inner faces 23a and 24a of the claw-like magnetic poles 23 and 24 which differ from each other and a support member which is molded in conformity with the claw-like magnetic poles 23 and 24.

When the magnet 30A is manufactured in consideration of molding ease, it becomes fragile. Therefore, when it is installed near the claw-like magnetic poles 23 and 24 of the rotor 7, some measure is necessary. However, when the magnet 30A is made sufficiently thick or very strong, it costs dear, making it difficult to mass-produce it.

Suppose that the magnet 30A and the support member are produced in accordance with the differences and that differences in the gaps between the claw-like magnetic poles 23 and 24 and the magnet 30A and between the claw-like magnetic poles 23 and 24 and the support member are made small. Even if the differences are small, when the magnet 30A receives centrifugal force at the time of the rotation of the rotor 7, a great force difference is produced, thereby making it possible that the magnet 30A and the support member are damaged.

When the magnet 30A is supported by the side faces 23C and 24c of the claw-like magnetic poles 23 and 24 irrespective of the inner faces 23a and 24a of the claw-like magnetic poles 23 and 24, force may be applied to the magnet 30A by the dislocation of each of the two pole core bodies 21 and 22 when they are mated with each other or dislocation caused by rotation force.

The end portions of the claw-like magnetic poles 23 and 24 are moved toward the rotor coil 13 and the stator 8 by centrifugal force generated by the rotation of the rotor 7 and the magnetic attraction force of the stator 8 at the time of power generation. Thereby, a load is applied to the magnet 30A between the claw-like magnetic poles 23 and 24, whereby the magnet 30A may be distorted or broken.

A countermeasure against this is disclosed by Japanese Laid-open Patent Application No. 11-136913. In this publication, a magnet 30B is formed as shown in FIG. 19 and FIG. 20. That is, the magnet 30B is fixed to each of the claw-like magnetic poles 23 and 24 in such a manner that it covers the inner face 23a or 24a and the side faces 23c or 24c of the claw-like magnetic pole 23 or 24. A space 25 is formed between adjacent magnets 30B. Thereby, a set of the claw-like magnetic pole 23 and the magnet 30B and a set of the claw-like magnetic pole 24 and the magnet 30B move independently, thereby preventing the application of a load to the magnet 30B and the breakage of the magnet 30B.

SUMMARY OF THE INVENTION

However, the invention disclosed by Japanese Laid-open Patent Application No. 11-136913 is not aimed to reduce the influence of centrifugal force generated by the rotation of the rotor 7 upon the magnet 30B.

That is, since the magnet 30B which moves together with the claw-like magnetic poles 23 and 24 is more fragile than the claw-like magnetic poles 23 and 24, the magnet 30B has low durability against centrifugal force. Further, since the magnet 30B is completely exposed, it is conceivable that it may be damaged by a suspending substance contained in the case 3. Further, as the magnet 30B is fixed to the claw-like magnetic poles 23 and 24 by the uneven surface of the magnet 30B, it is unsatisfactory in terms of strength against rotation.

A support member such as a tape is wound round each of the claw-like magnetic poles 23 and 24 to absorb centrifugal force applied to the magnet 30B. This does not take into consideration the movement of the magnet 30B during rotation and hence, the magnet 30B cannot be always held properly by the tape. That is, the weight of the support member is applied to the magnet 30B by the rotation of the rotor 7, or the magnet 30B is supported nonuniformly, whereby not only the magnet 30oA but also the support member may be broken at the time of high-speed rotation.

When the side faces 23c and 24c of the claw-like magnetic poles 23 and 24 are inclined in an axial direction or in a radial direction, the magnet 30B fixed to the claw-like magnetic poles 23 and 24 is also inclined. When the magnet 30B is to be fixed, it may be inclined toward the center of the axis or get out of place. Therefore, the magnet 30B must be temporarily positioned to prevent this, thereby taking time and labor to fix. When the two pole core bodies 21 and 22 are to be mated with each other in such a manner that they surround the rotor coil 13, the magnets 30B for either one of the claw-like magnetic poles 23 and 24 are inclined and dropped. Further, when the shaft 6 is installed in the case and the generator is carried, there is a possibility that the magnets 30B may fall off toward the center of the axis.

When an adhesive is applied to the magnets 30 in order to temporarily fix the magnets 30 to the claw-like magnetic poles 23 and 24 at this point, it is known that it is good to apply force for bringing adhesion surfaces close to each other in order to secure the positional relationship between them before drying and fixing. In this respect, force is readily applied to the above claw-like magnetic poles 23 and 24 and the above magnets 30 in such a direction that they are separated from each other, and a holding step is further required in the step of coating an adhesive, thereby making it possible that the assembly work becomes very complicated and cost becomes high. If some trouble occurs during this, when a rotor structure is used as a car AC generator which is used in a severe environment such as high temperatures or low temperatures for a long time, bonding portions between the claw-like magnetic poles 23 and 24 and the magnets 30B may deteriorate with the result that the magnets 30 may be scattered.

It is an object of the present invention which has been made to solve the above problems to reduce centrifugal force applied to magnets for suppressing the leakage of a magnetic flux between claw-like magnetic poles at the time of rotation of the rotor and to attach the magnets to the claw-like magnetic poles.

According to a first aspect of the present invention, there is provided a rotor structure comprising a rotor coil for generating a magnetic flux, a pole core which covers the rotor coil and consists of a first pole core body and a second pole core body, each having a plurality of claw-like magnetic poles which are mated with each other, magnets provided on both sides of each claw-like magnetic pole to suppress the leakage of a magnetic flux between the side faces of adjacent claw-like magnetic poles, and reinforcements for holding the magnets in such a manner that the magnets are inclined so that the interval between the magnets becomes larger on the outer side than on the inner side.

According to a second aspect of the present invention, there is provided a rotor structure, wherein the reinforcement consists of an inner portion conformed to the inner face of the claw-like magnetic pole, bent portions bent from both ends of the inner portion toward the side faces of the claw-like magnetic pole, pressing portions, bent from the bent portions, for pressing the outer faces of the magnets, and folded portions folded from the pressing portions toward the side faces of the magnets, and the magnets are held on the inner side of the reinforcement.

According to a third aspect of the present invention, there is provided a rotor structure, wherein the reinforcement consists of an inner portion conformed to the inner face of the claw-like magnetic pole and the inner faces of the magnets, bent portions bent from both ends of the inner portion toward the side faces of the magnets, and pressing portions, projecting from the bent portions toward the claw-like magnetic pole, for pressing the outer faces of the magnets, and the magnets are held on the outer side of the reinforcement.

According to a fourth aspect of the present invention, there is provided a rotor structure, wherein the magnet and portions holding the magnet of the reinforcement constitute a side magnet body, a space is formed between the side magnet body and the side face of the claw-like magnetic pole, the side magnet body moves toward the claw-like magnetic pole to reduce the space when centrifugal force is applied to the magnet, and the reinforcement is deformed by this moving force to absorb the centrifugal force.

According to a fifth aspect of the present invention, there is provided a rotor structure, wherein the center of the movement of the side magnet body is located on the claw-like magnetic pole side of a line connecting the center of the rotation axis of the rotor and the gravity center of the magnet, and the movement of the side magnet body is stopped when it contacts the side face of the claw-like magnetic pole.

According to a sixth aspect of the present invention, there is provided a rotor structure, wherein the magnet is held by the pressing portion and the folded portion and constitutes a side magnet body together with the pressing portion and the folded portion, a space is formed between the side magnet body and the side face of the claw-like magnetic pole, a space is formed between adjacent side magnet bodies, the side magnet body moves toward the adjacent side magnetic body to reduce the space between the adjacent side magnet bodies when centrifugal force is applied to the magnet, the reinforcement is deformed by this moving force to absorb the centrifugal force, and the movement of the side magnet body is stopped when the adjacent folded portions contact each other.

According to a seventh aspect of the present invention, there is provided a rotor structure, wherein the space between the side magnet body and the side face of the claw-like magnetic pole is set such that the deformed reinforcement can restore its original shape when centrifugal force is not applied to the magnet after the movement of the side magnet body is stopped and the deformation amount of the reinforcement becomes maximum.

According to an eighth aspect of the present invention, there is provided a rotor structure, wherein the space between the side magnet body and the side face of the claw-like magnetic pole is set such that stress applied to the reinforcement falls below at least an allowable level when the movement of the side magnet body is stopped and the deformation amount of the reinforcement becomes maximum.

According to a ninth aspect of the present invention, there is provided a rotor structure, wherein an elastic material is placed in the space between the side magnet body and the side face of the claw-like magnetic pole.

According to a tenth aspect of the present invention, there is provided a rotor structure which has a stopping structure for preventing the reinforcement from falling off from the claw-like magnetic pole in an inward direction.

According to an eleventh aspect of the present invention, there is provided a rotor structure which has a stopping structure for preventing the reinforcement from falling off from the claw-like magnetic pole in an outward direction.

According to a twelfth aspect of the present invention, there is provided a rotor structure which has a stopping structure for preventing the reinforcement from falling off from the claw-like magnetic pole in inward and outward directions.

According to a thirteenth aspect of the present invention, there is provided a rotor structure, wherein the above stopping structure is contacting portions which project from the reinforcement and contact the outer face of the claw-like magnetic pole.

According to a fourteenth aspect of the present invention, there is provided a rotor structure, wherein a pressing member for pressing the reinforcements against the claw-like magnetic poles from the inner side is used as the stopping structure.

According to a fifteenth aspect of the present invention, there is provided a rotor structure, wherein the pressing member has a cylindrical peripheral surface, grooves in which the claw-like magnetic poles held in the reinforcements are fitted in are formed in the peripheral surface, and the outer faces of the claw-like magnetic poles and the peripheral surface of the pressing member form the cylindrical curved peripheral surface of the rotor.

According to a sixteenth aspect of the present invention, there is provided a rotor structure, wherein the side faces of the claw-like magnetic pole are inclined such that the interval between them becomes larger on the outer side than on the inner side.

According to a seventeenth aspect of the present invention, there is provided a rotor structure, wherein the gravity center of the magnet is located close to the root side of the claw-like magnetic pole.

According to an eighteenth aspect of the present invention, there is provided a rotor structure, wherein the reinforcement is made from a metal.

According to a nineteenth aspect of the present invention, there is provided a rotor structure, wherein the reinforcement is welded to the claw-like magnetic pole.

According to a twentieth aspect of the present invention, there is provided a rotor structure, wherein the reinforcement has a stopping structure for preventing the magnets from falling off toward the end side or root side of the reinforcement.

The above and other objects, features and advantages of the invention will become more apparent from the following description when taken in conjunction with the accompanying drawings.

BRIEF DESCRIPTION OF THE ACCOMPANYING DRAWINGS

Figure 7:
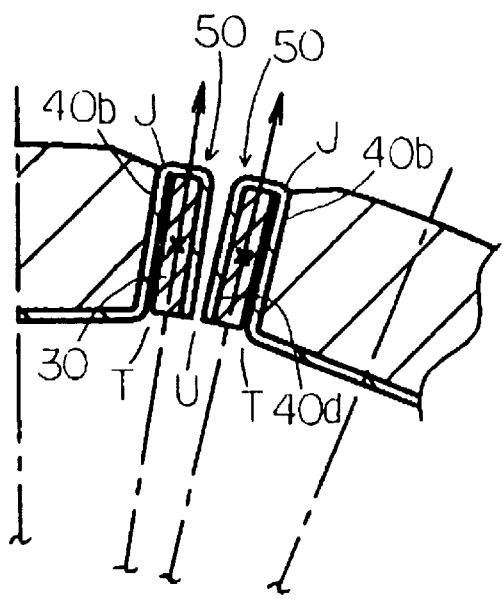
Figure 7:
Figure 7:
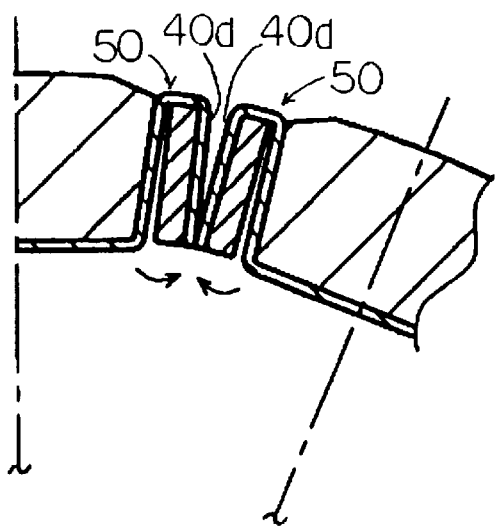
Figure 7:
Figure 8:
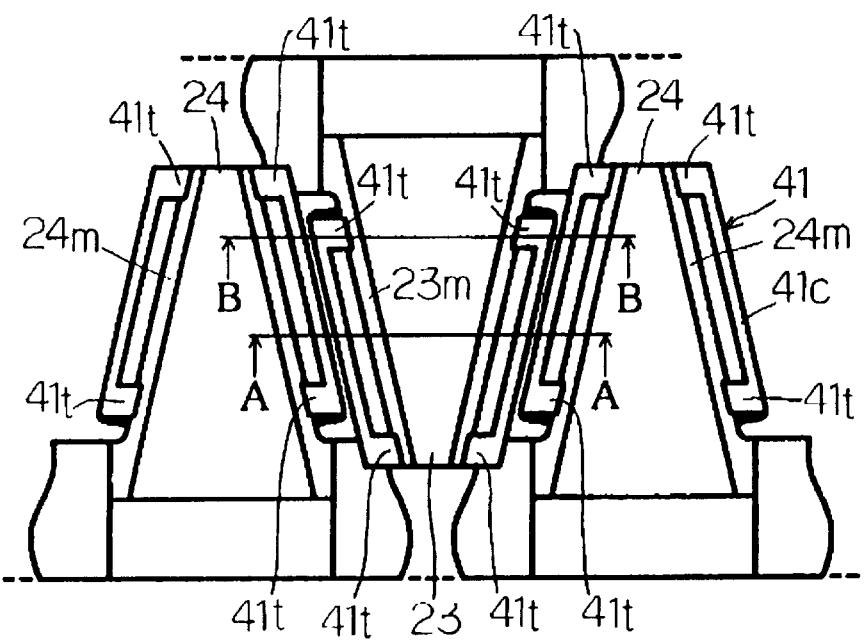
Figure 9:
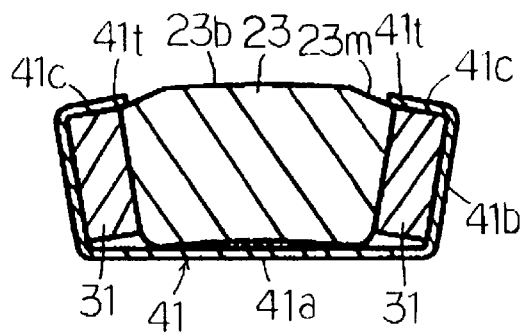
Figure 9:
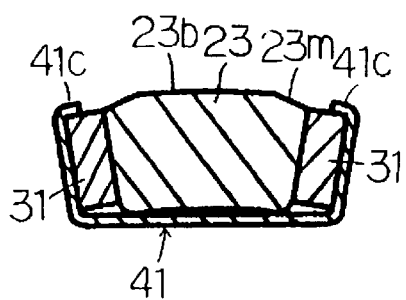
Figure 10:
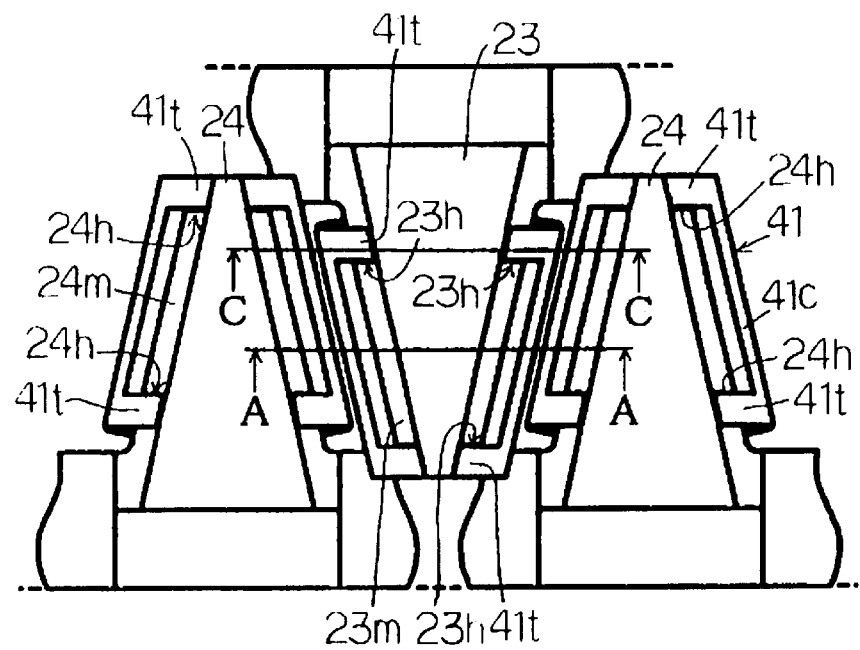
Figure 11A:
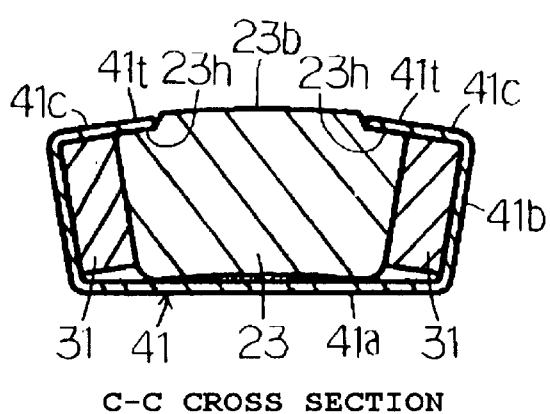
Figure 11B:
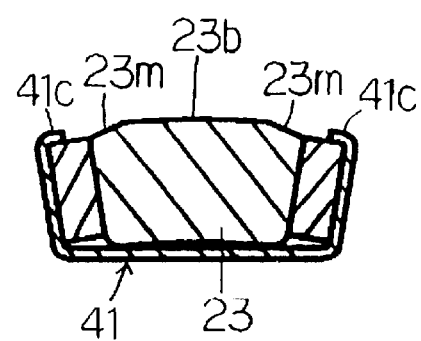
Figure 12:
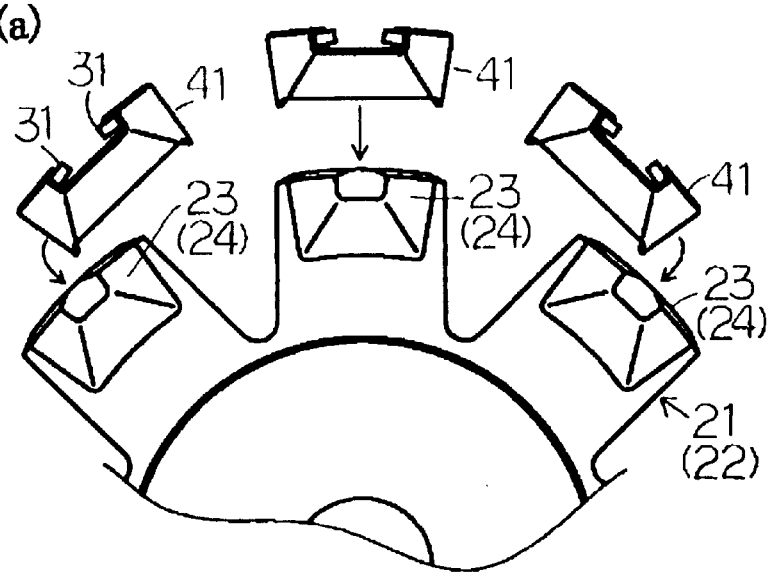
Figure 12:
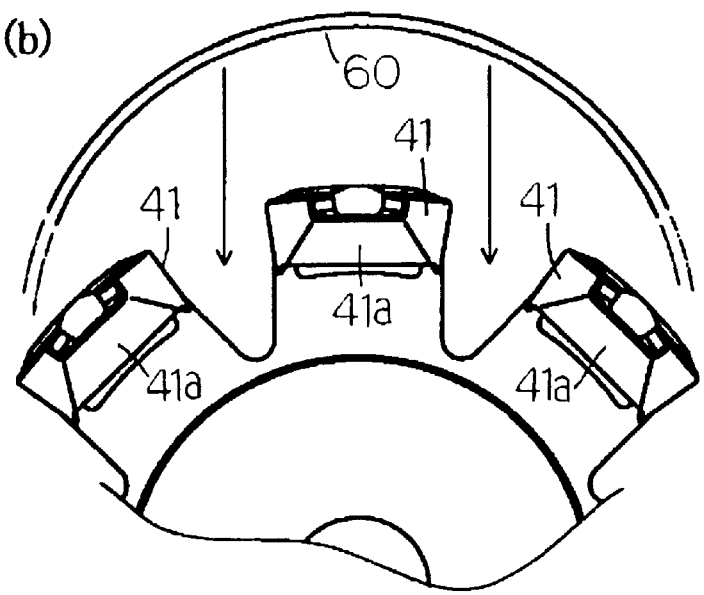
Figure 12:
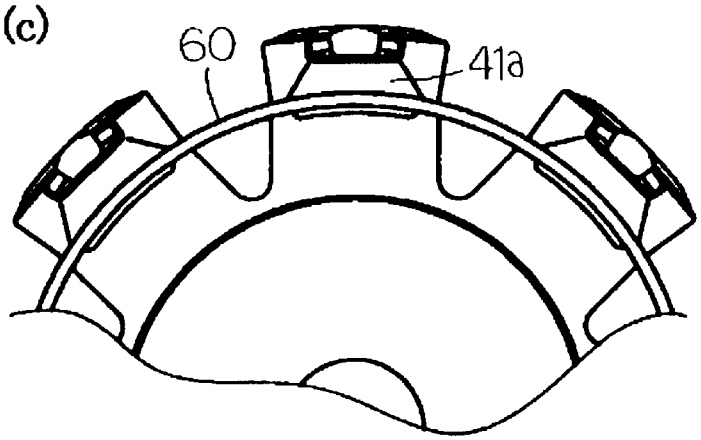
Figure 13:
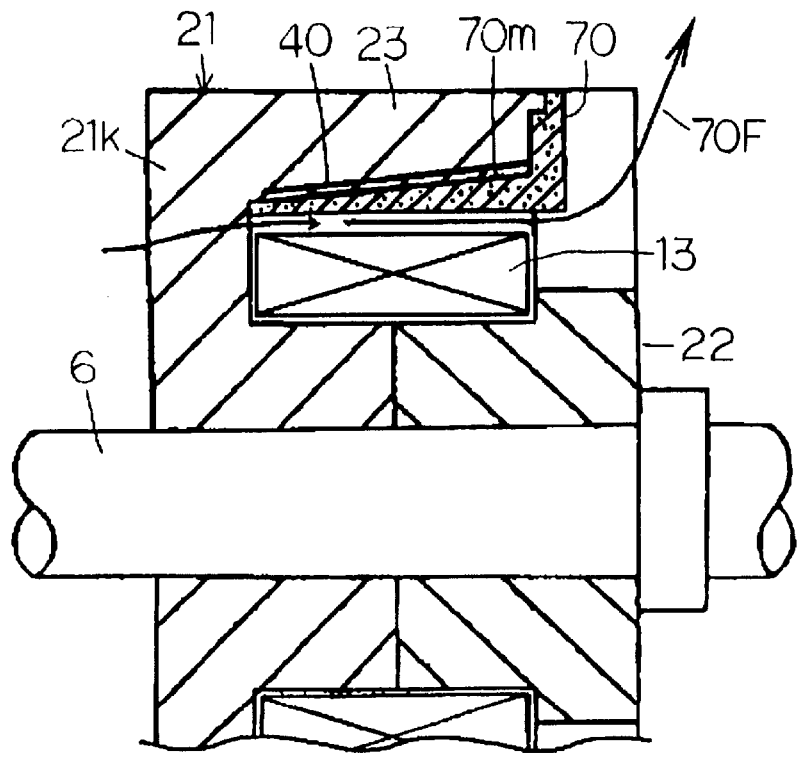
Figure 14:
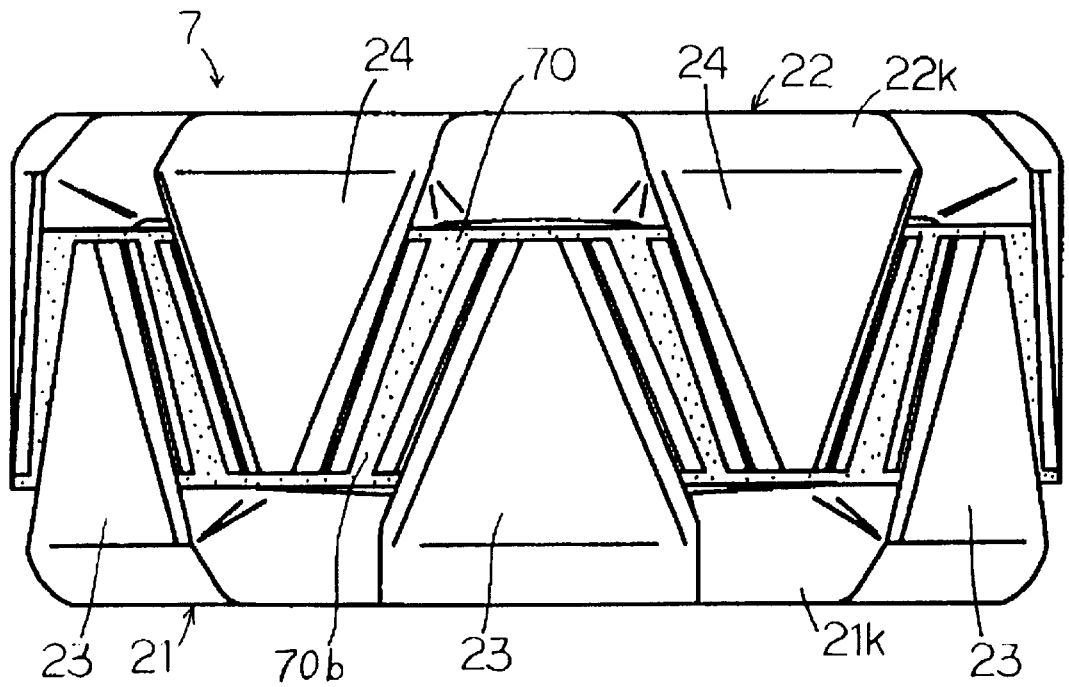
Figure 15A:
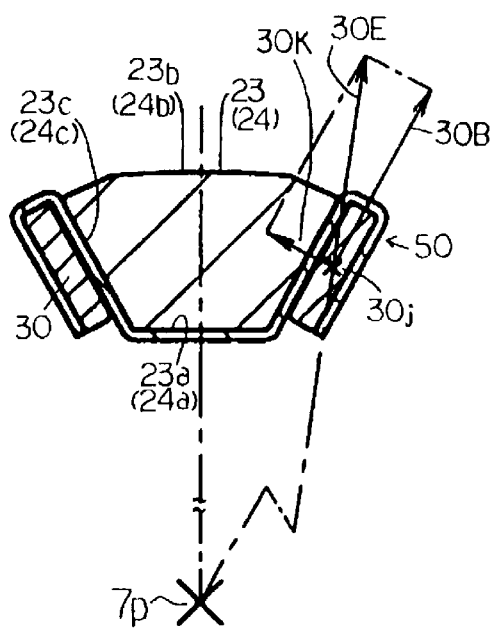
Figure 15B:
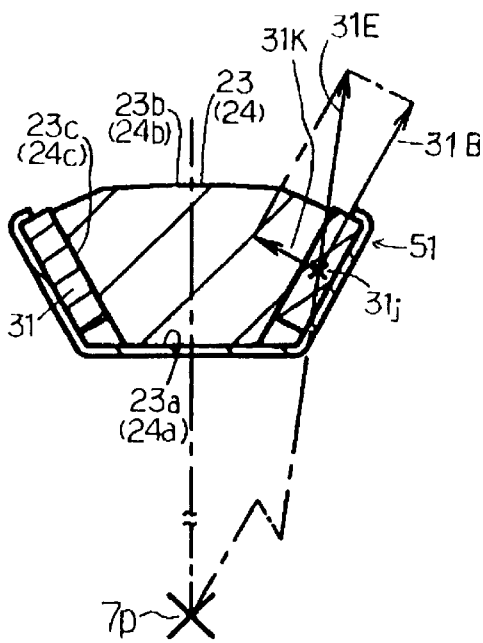
Figure 16:
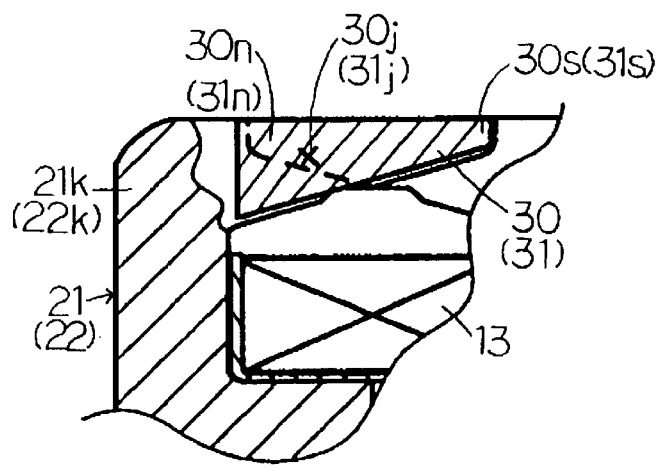
Figure 17:
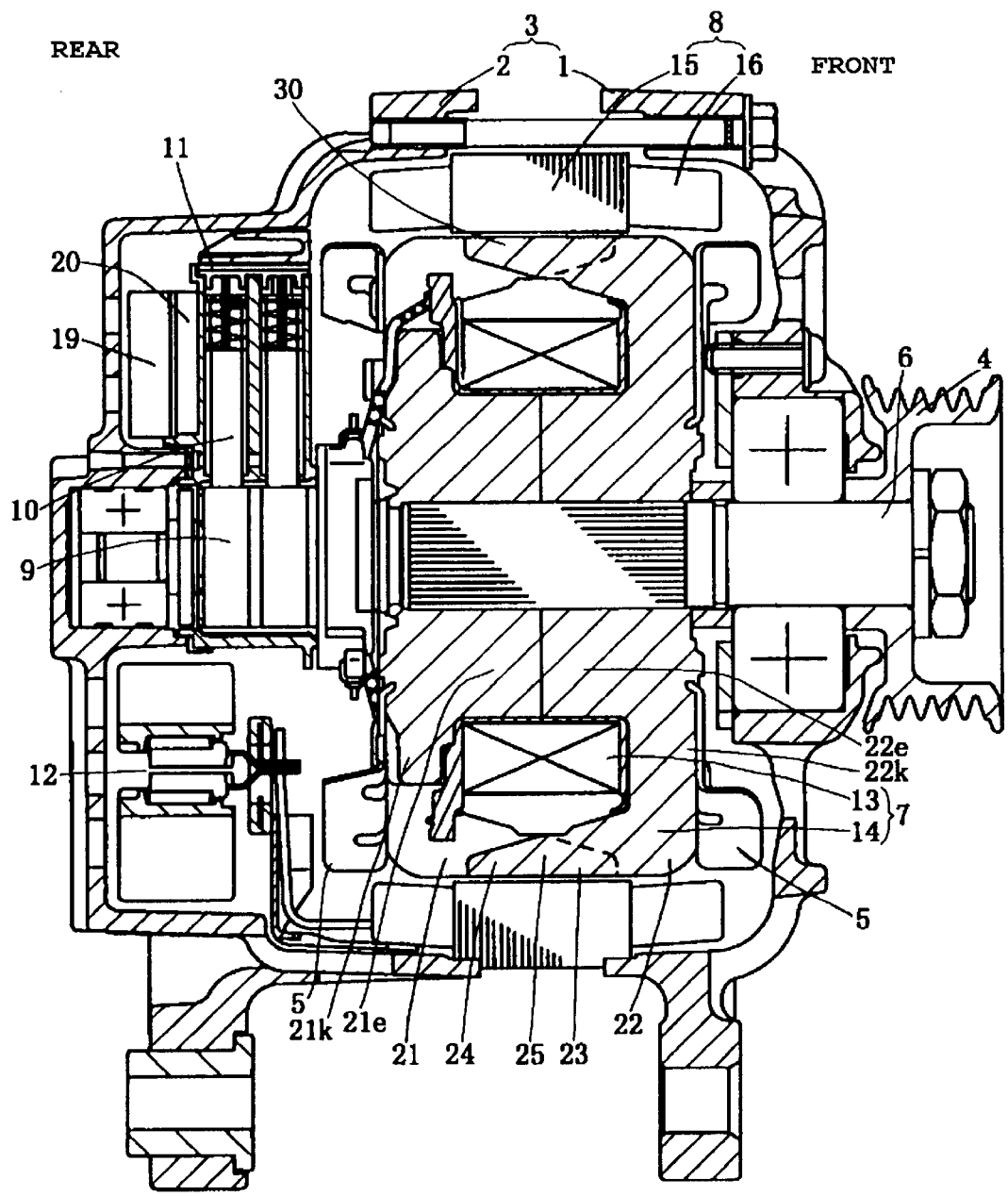
Figure 18:
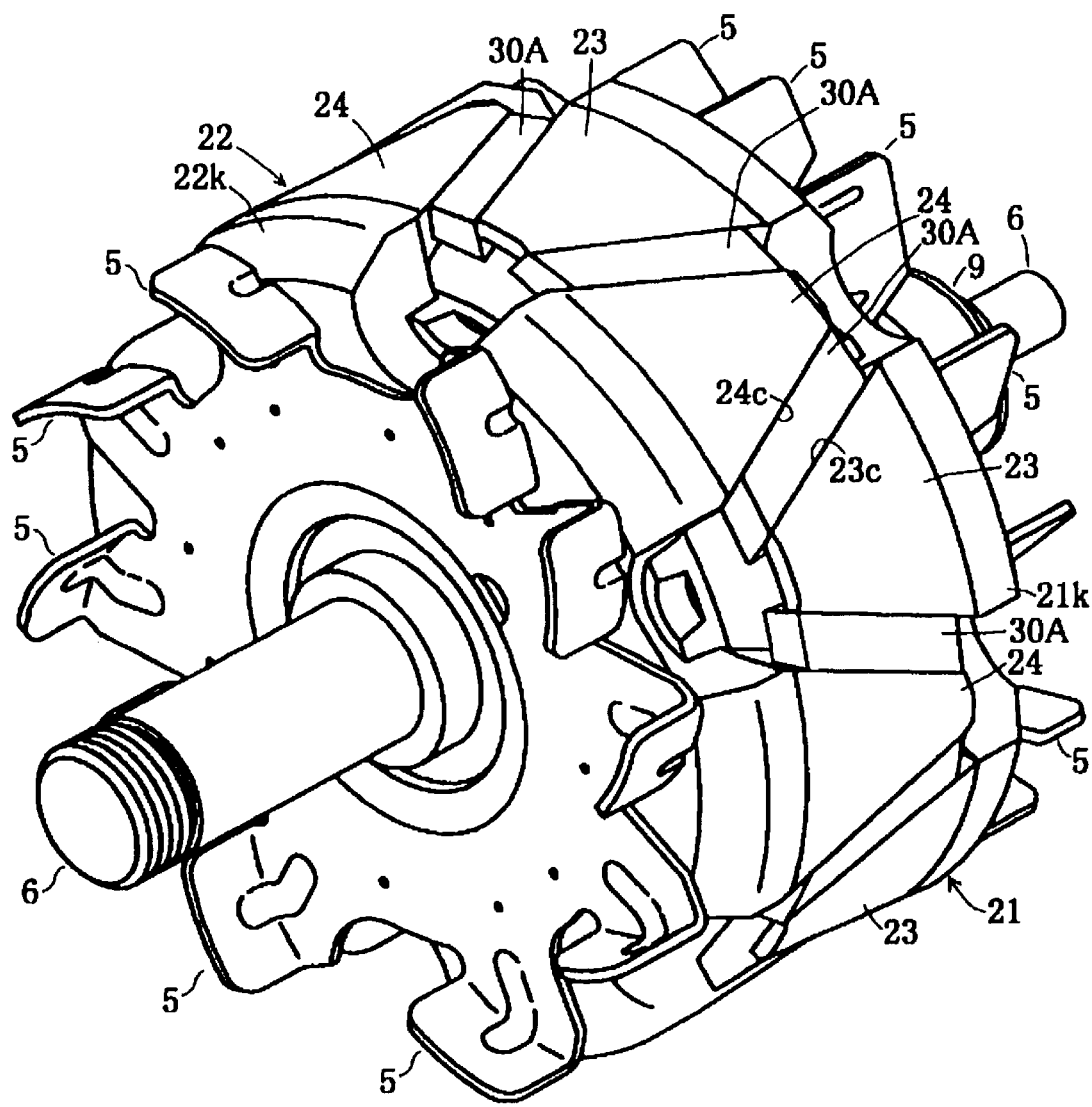
Figure 19:
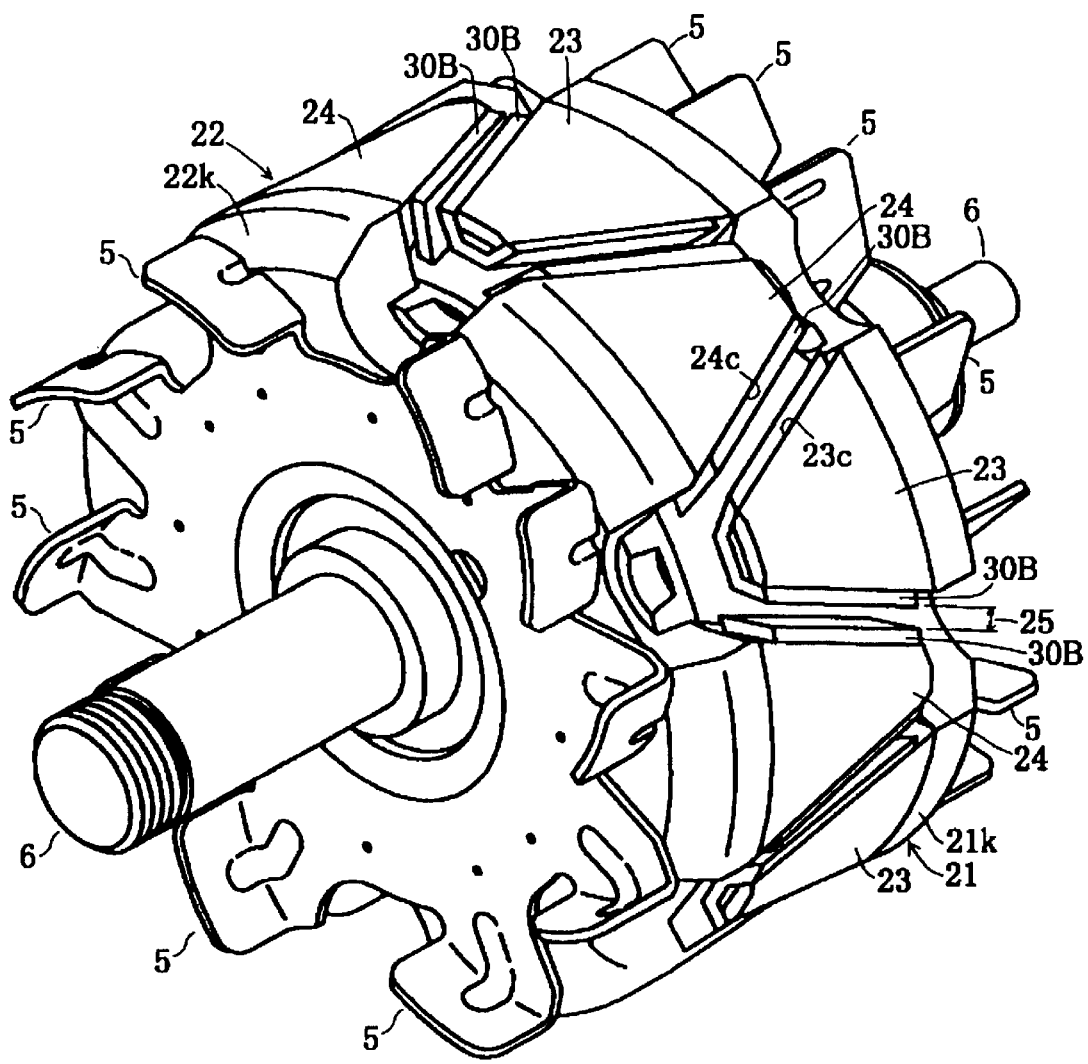

FIGS. 7(a) and 7(b) are sectional views in an axial direction of a claw-like magnetic pole, a reinforcement and magnets according to Embodiment 3;

FIG. 8 is a schematic side view of contacting portions according to Embodiment 4;

FIGS. 9(a) and 9(b) are sectional views in an axial direction of a claw-like magnetic pole and contacting portions of a reinforcement and magnets according to Embodiment 4;

FIG. 10 is a schematic side view of stepped portions according to Embodiment 5;

FIGS. 11(a) and 11(b) are sectional views in an axial direction of stepped portions of a claw-like magnetic pole, contacting portions of a reinforcement and magnets according to Embodiment 5;

FIGS. 12(a), 12(b) and 12(c) are plan views of a pressing member set on reinforcements according to Embodiment 6;

FIG. 13 is a sectional view in an axial direction of a pressing member according to Embodiment 7;

FIG. 14 is a side view of a pressing member and a rotor according to Embodiment 7;

FIGS. 15(a) and 15(b) are sectional views in an axial direction of the side faces of a claw-like magnetic pole, a reinforcement and magnets according to Embodiment 8;

FIG. 16 is a sectional view in a circumferential direction of a claw-like magnetic pole and magnets according to Embodiment 9;

FIG. 17 is a sectional view of a car AC generator for explaining a prior art rotor structure;

FIG. 18 is a perspective view for explaining a prior art rotor structure;

FIG. 19 is a perspective view for explaining a prior art rotor structure; and

Figure 20:
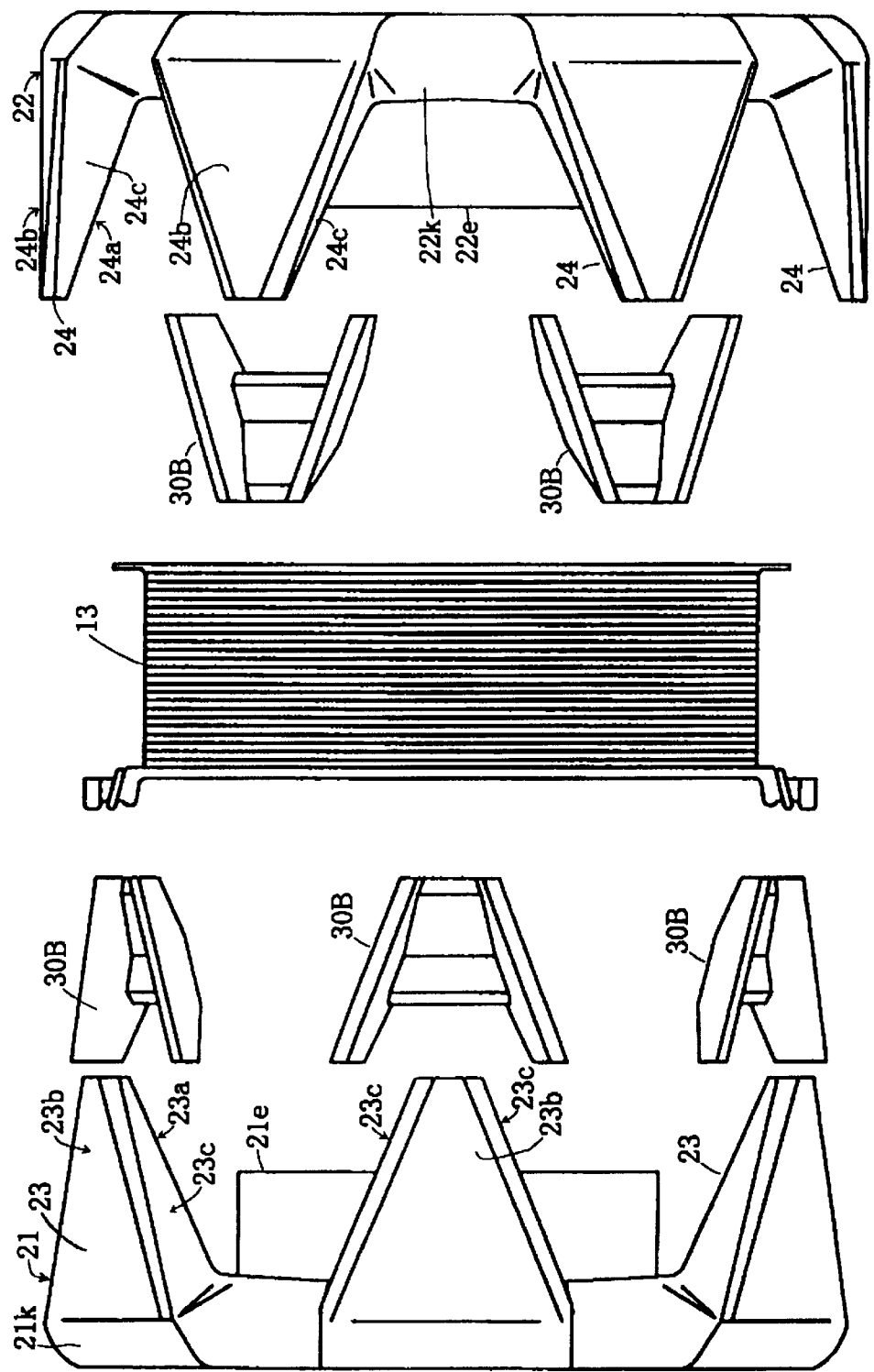

FIG. 20 is an exploded side view for explaining a prior art rotor structure.

DETAILED DESCRIPTION OF THE PREFERRED EMBODIMENTS

Preferred embodiments of the present invention will be described herein under with reference to the accompanying drawings.

Embodiment 1

Figure 1:
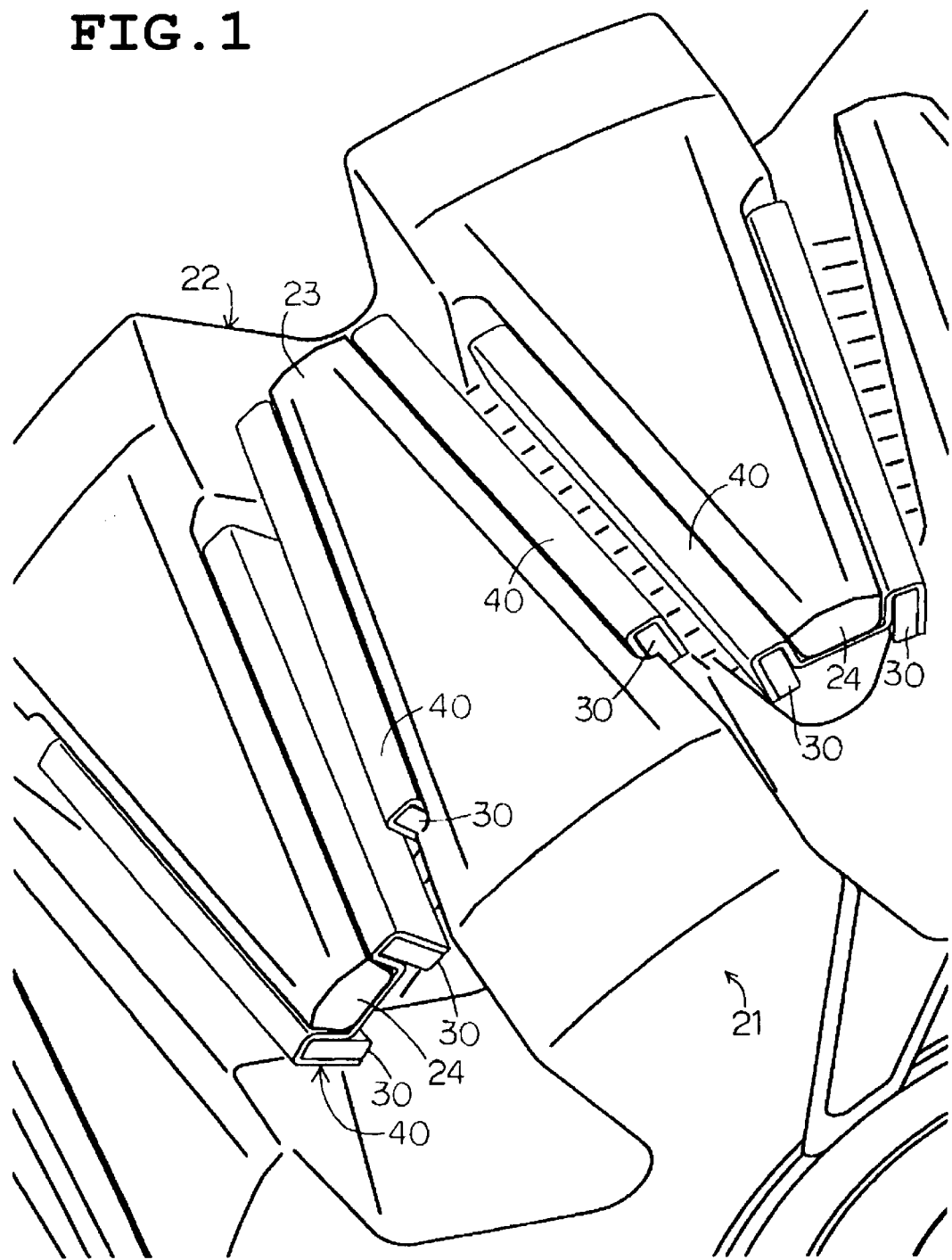
FIG. 1 is a perspective view of key parts of a rotor structure according to Embodiment 1 of the present invention.
Figure 2:
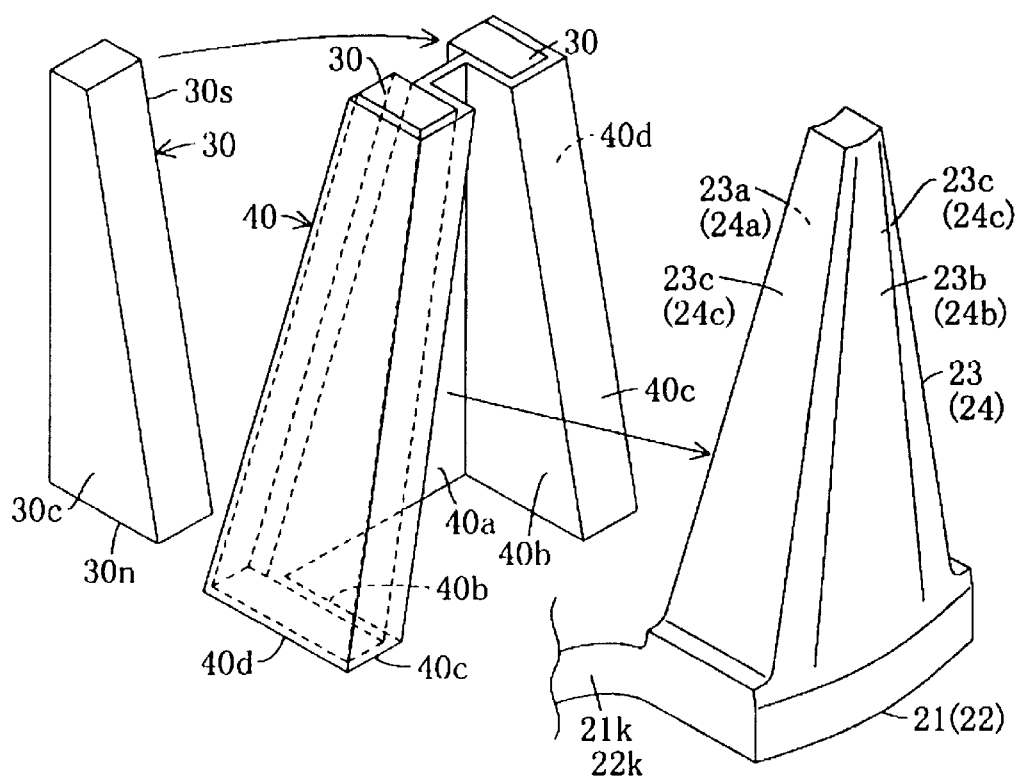
FIG. 2 is an exploded perspective view of the key parts of the rotor structure according to Embodiment 1.
Figure 3:
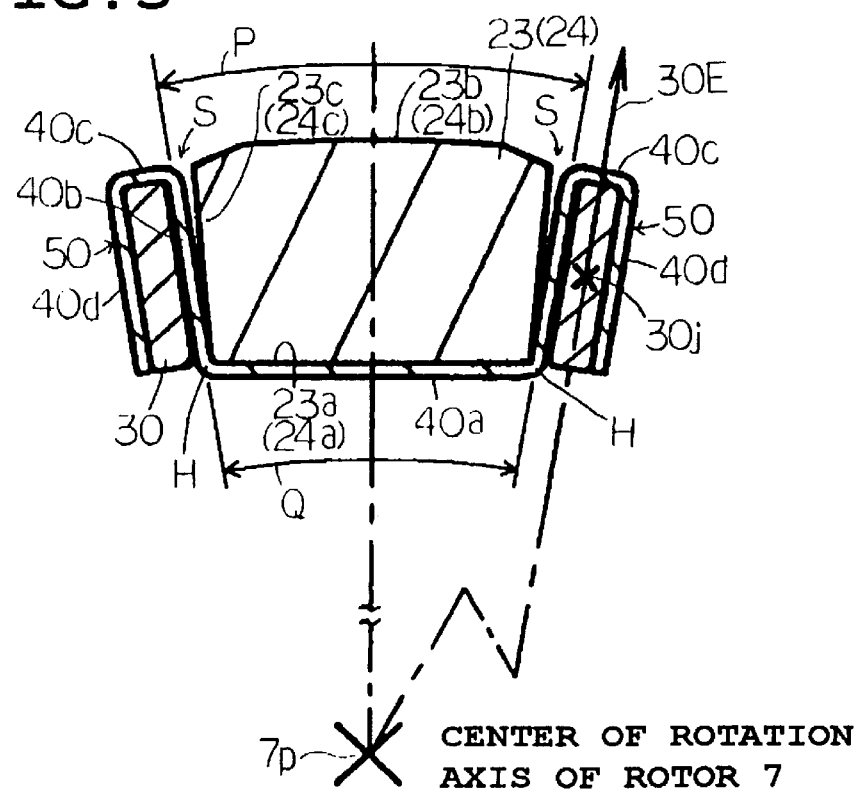
FIG. 3 is a sectional view in an axial direction of a claw-like magnetic pole, a reinforcement and magnets according to Embodiment 1.

FIGS. 1 to 3 show a rotor structure for use in a car AC generator according to Embodiment 1 of the present invention. FIG. 1 is a perspective view of key parts of a rotor for a car AC generator, FIG. 2 is an exploded perspective view and FIG. 3 is a sectional view of a reinforcement. The same and corresponding elements as those of FIGS. 17 to 20 are given the same reference symbols.

As shown in FIG. 1, a ferrite magnet 30 magnetized to suppress the leakage of a magnetic flux between claw-like magnetic poles 23 and 24 is provided on both side faces 23c and 23c of each claw-like magnetic pole 23 and both side faces 24c and 24c of each claw-like magnetic pole 24.

The magnets 30 are held to the claw-like magnetic pole 23 or 24 by a reinforcement 40 which is deformed to absorb centrifugal force applied to the magnets 30 at the time of rotation of a rotor 7 in such a manner they are inclined so that the interval between the magnets 30 becomes larger on the outer side than on the inner side. The reinforcement 40 is made of a metal plate such as a stainless steel plate having a thickness of about 0.5 mm and easily manufactured by bending a single metal plate by pressing.

As shown in FIG. 2 and FIG. 3, this reinforcement 40 has a substantially M-shaped cross section in an axial direction of the rotor 7 and consists of a trapezoidal inner portion 40a conformed to the inner face 23a or 24a of the claw-like magnetic pole 23 or 24, bent portions 40b bent outward from both ends of the inner portion 40a and conformed to both side faces 23c or 24c of the claw-like magnetic pole 23 or 24, pressing portions 40c bent from the ends of the bent portions 40b toward the outer faces of the magnets 30 and pressing the outer faces of the magnets 30, and folded portions 40d folded from the pressing portions 40c toward the side faces of the magnets 30.

The magnets 30 are surrounded by the bent portions 40b, the pressing portions 40c and the folded portions 40d and sandwiched between the bent portions 40b and the folded portions 40d to hold them on the inner side of the reinforcement 40 from the outer side.

As shown in FIG. 3, the inner portion 40a and the bent portions 40b and 40b at both ends of the inner portion 40a form an almost U shape in such a manner that the bent portions 40b and 40b are inclined so that the length Q on the inner side becomes smaller than the length P on the outer side. The bent portions 40b, the pressing portions 40c and the folded portions 40d of the reinforcement 40 surrounding the magnets 30 form an inverted U shape in conformity with the cross section of the magnet 40.

That is, the magnets 30 are provided on both side faces 23c or 24c of the claw-like magnetic pole 23 or 24 in such a manner that they are inclined from the center line of the claw-like magnetic pole 23 or 24 passing through the center 7p of the rotation axis of the rotor 7 toward the outer face 23b or 24b.

As shown in FIG. 2, the magnet 30 does not require a holding portion for the claw-like magnetic pole 23 or 24, and the side faces 30c of the magnet are trapezoidal in conformity with the side face 23c or 24c of the claw-like magnetic pole 23 or 24. The magnet 30 is shaped like a headed quadrangular pyramid whose width is almost fixed and thickness increases from the end 30s side toward the root 30n side in conformity with the shape of the claw-like magnetic pole 23 or 24. The magnet 30 may be rectangular.

An adhesive or the like is used to hold the magnet 30 by the reinforcement 40 and fix it to the claw-like magnetic pole 23 or 24. That is, the boundary between the inner portion 40a of the reinforcement 40 and the inner face 23a or 24a of the claw-like magnetic pole 23 or 24 and the boundary between the bent portion 40b, pressing portion 40c and folded portion 40d of the reinforcement 40 and the magnet 30 are coated with an adhesive.

To fix the magnet 30 to the claw-like magnetic pole 23 or 24, the side face 23c or 24c of the claw-like magnetic pole 23 or 24 is separated from the bent portion 40b of the reinforcement 40 with a small space S therebetween.

By this constitution, centrifugal force 30E applied to the gravity center 30j of the magnet 30 at the time of the rotation of the rotor 7 in FIG. 3 becomes moment for moving the magnet 30 and portions holding the magnet 30 of the reinforcement 40 and is absorbed by the reinforcement 40. A set of the magnet 30 and the portions holding the magnet 30 of the reinforcement 40 (bent portion 40b, pressing portion 40c and folded portion 40d) is called "side magnet body 50" and moment applied to the side magnet body 50 will be described with reference to FIG. 3.

That is, the side magnet body 50 is supported only at one side because its fulcrum H is located at each end of the inner portion 40a of the reinforcement 40. That is, the fulcrum H is located on the claw-like magnetic pole 23 or 24 side of a line connecting the center 7p of the rotation axis of the rotor 7 and the gravity center 30j of the magnet 30. Thereby, centrifugal force 30E applied to the magnet 30 is applied to the reinforcement 40 as the above moment. The direction of the above moment applied to the side magnet body 50 is the center direction of the reinforcement 40, that is, the center direction of the claw-like magnetic pole 23 or 24 with the fulcrum H as the center of the movement.

Therefore, the outer side of the side magnet body 50 moves and displaces toward the side face 23c or 24c of the claw-like magnetic pole 23 or 24. Stress is applied to the reinforcement 40 by this displacement but the reinforcement 40 is not broken because the above small space S is formed to reduce the stress to a level below an allowable level. In this case, this small space S is set such that the reinforcement 40 restores its original shape when centrifugal force 30E is not applied to the magnet 30 any more after the displacement of the reinforcement 40.

Thereby, the reinforcement 40 holds the claw-like magnetic pole 23 or 24, thereby increasing its holding strength with the result that the connection of the magnet 40 and the claw-like magnetic pole 23 or 24 is promoted.

When the end portion of the claw-like magnetic pole 23 or 24 is moved inward or outward at the time of the rotation of the rotor 7, it is possible that the end portion of the side magnet body 50 is moved outward by the spring-back of the reinforcement 40. However, the displacement of the side magnet body 50 by the above moment occurs in a direction which offsets the above spring-back, thereby making it possible to eliminate such inconvenience that the magnet 30 and the reinforcement 40 fall off from the claw-like magnetic pole 23 or 24.

Since the inner face 23a or 24a of the claw-like magnetic pole 23 or 24 is in contact with the inner portion 40a of the reinforcement 40, heat transmitted to the claw-like magnetic poles 23 and 24 at the time of power generation is radiated by the reinforcement 40. However, the main purpose of Embodiment 1 is to reduce centrifugal fore 30E applied to the magnet 30.

The inner face facing the rotor coil 13 of the magnet 30 held by the reinforcement 40 is exposed so that heat generated at the time of power generation is radiated therefrom. Since the remaining three faces of the magnet 30 are almost surrounded by the reinforcement 40, the magnet 30 has high resistance to centrifugal force. Even if a suspending substance should hit the magnet 30 from the outer side, as the magnet 30 is covered with the reinforcement 40, it is not damaged.

The magnet 30 is not chipped at the time of assembly because it is attached to the claw-like magnetic pole 23 or 24 while it is covered with the reinforcement 40 and has no faces in contact with the claw-like magnetic pole 23 or 24.

Although a cut-away portion in which the reinforcement 40 is fitted is formed in the side faces 23c and 24c of the claw-like magnetic poles 23 and 24, the claw-like magnetic poles 23 and 24 are the same as those of the prior art in that they are tapered off toward the ends. Therefore, a space formed between the side faces 23c and 24c of the claw-like magnetic poles 23 and 24 is substantially rhomboid when seen from a circumferential direction. A space formed between the reinforcements 40 by which the magnets 30 are fixed to the side faces 23c or 24c of the claw-like magnetic poles 23 and 24 is narrow in width but substantially rhomboid as well. Thereby, even when the ends of the claw-like magnetic poles 23 and 24 move at the time of the rotation of the rotor 7, the magnet 30 is not applied with stress and not broken.

The reinforcement 40 is fixed to the claw-like magnetic poles 23 and 24 by an adhesive or the like. Since the reinforcement 40 is made from a metal, the inner faces 23a and 24a of the claw-like magnetic poles 23 and 24 may be welded to the inner portion 40a of the reinforcement 40.

Although the small space S is formed between both side faces 23c or 24c of the claw-like magnetic pole 23 or 24 and the bent portions 40b of the reinforcement 40, an elastic material such as rubber or resin may be placed in this small space S. The elastic material is shaped like a triangular prism, thin plate or rod in conformity with the small space S so that it can be easily inserted into the space. The same effect as described above can be obtained and the elastic material can absorb impact force and suppress the entry of foreign matter.

Embodiment 2

Figure 4:
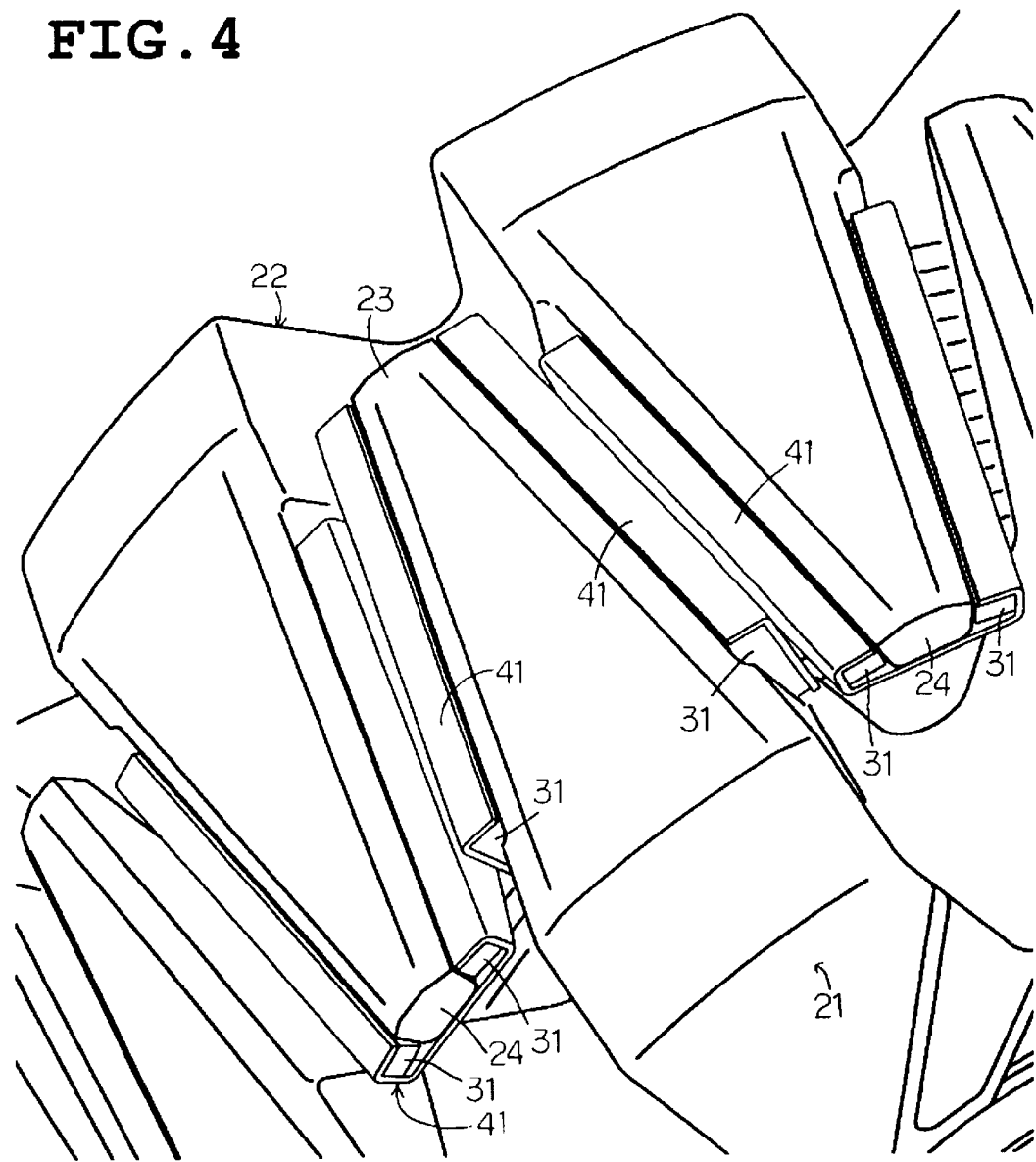
FIG. 4 is a perspective view of key parts of a rotor structure according to Embodiment 2.

In the above Embodiment 1, the cross section of the reinforcement 40 is substantially M-shaped. In this Embodiment 2, as shown in FIG. 4 and FIG. 5, a reinforcement 41 having a substantially C-shaped cross section is used.

Figure 5:
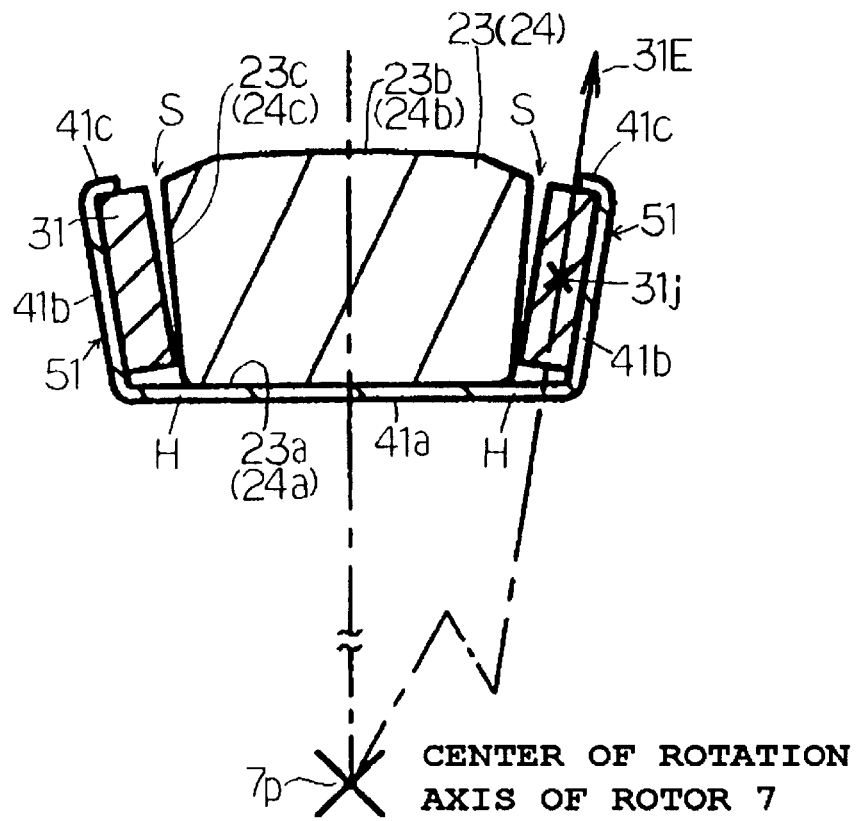
FIG. 5 is a sectional view in an axial direction of a claw-like magnetic pole, a reinforcement and magnets according to Embodiment 2.

As shown in FIG. 5, the reinforcement 41 consists of a trapezoidal inner portion 41a extended to the inner faces of magnets 31 along the inner face 23a or 24a of the claw-like magnetic pole 23 or 24, bent portions 41b bent outward from both ends of the inner portion 41a and holding the side faces of the magnets 31, and pressing portions 41c projecting from the ends of the bent portions 41b toward the claw-like magnetic pole 23 or 24 and pressing the magnets 31 inward. The pressing portions 41c do not need to cover the entire outer faces of the magnets 31 and extend to intermediate positions of the outer faces of the magnets 31 to cover more than half the outer faces of the magnets 31 so that they can hold the magnets 31 firmly. There is a gap between the pressing portion 41c and the claw-like magnetic pole 23 or 24 so that part of the outer face of the magnet 31 is exposed.

The magnet 31 is sandwiched between the bent portion 41b of the reinforcement 41 and the side face 23c or 24c of the claw-like magnetic pole 23 or 24 from the inner side and fixed to the claw-like magnetic pole 23 or 24 by holding it on the outer side of the reinforcement 41.

The pressing portion 41c prevents the magnet 31 from falling off from the end of the claw-like magnetic pole 23 or 24 by holding the magnet 31 with the inner portion 41a in a wedge form because the root portion of the magnet 31 is thick.

Since three faces of the magnet 31 are almost surrounded by the reinforcement 41 and the remaining one face of the magnet 31 is in contact with the side face 23c or 24c of the claw-like magnetic pole 23 or 24, the magnet 31 has no large exposed face and has high durability. The magnet 31 can be larger in width than the magnet 30 of Embodiment 1. That is, when attention is paid to the space between the claw-like magnetic poles 23 and 24, the reinforcement 41 does not need to have a portion corresponding to the folded portion 40d of the reinforcement 40 and the thickness in a circumferential direction of the reinforcement 41 is smaller than that of the reinforcement 40. As a result, the magnet 31 becomes larger than the magnet 30 and the output of the car AC generator rises.

Like Embodiment 1, there is a small space S between the side faces 23 or 24 of the claw-like magnetic pole 23 or 24 and the magnets 31 and other portions are fixed by an adhesive or the like. That is, the boundary between the magnet 31 and the bent portion 41b and the pressing portion 41c of the reinforcement 41 is coated with an adhesive and these elements constitute a side magnet body 51.

When the moment of centrifugal force 31E applied to the gravity center 31j of the magnet 31 is taken into consideration, it is the same as in Embodiment 1. That is, the side magnet body 51 displaces in the center direction of the claw-like magnetic pole 23 or 24 with the fulcrum H of the inner portion 41a located at a corner portion between the side face 23c or 24c and the inner face 23a or 24a of the claw-like magnetic pole 23 or 24 as the center of movement.

The difference between Embodiment 1 and Embodiment 2 is that the length of the inner portion 41a covering the inner faces of the magnets 31 of the reinforcement 41 is larger than the length of the inner portion 40a and force for offsetting the spring-back of the reinforcement 41 is larger in Embodiment 2 because the magnets 31 are arranged on the outer side of the reinforcement 41. Thereby, the prevention of the magnets 31 from falling off is promoted and the claw-like magnetic pole 23 or 24 and the magnets 31 are connected to each other more firmly.

Figure 6:
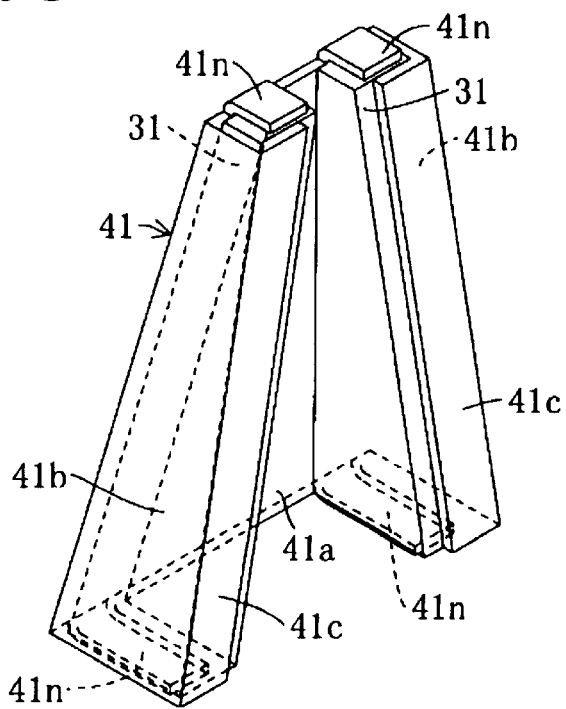
FIG. 6 is a perspective view of the stopping portions of the reinforcement according to Embodiment 2.

As shown in FIG. 6, stopping portions 41n and 41n may be formed by bending the both upper and lower ends of the inner portion 41a of the reinforcement 41. Thereby, the magnets 31 can be prevented from falling off from the end and root sides of the reinforcement 41 without fail. The stopping portions 41n may be formed at both upper and lower ends of the bent portions 41b.

Embodiment 3

In the above Embodiment 1, the small space S is formed between the side faces 23c or 24c of the claw-like magnetic pole 23 or 24 and the bent portions 40b of the reinforcement 40. In this Embodiment 3, as shown in FIGS. 7(a) and 7(b), the magnet 30 is bonded to the pressing portion 40c and the folded portion 40d. The pressing portion 40c, the folded portion 40d and the magnet 30 constitute a side magnet body 50. A small space U is formed between adjacent side magnet bodies 50 and a small space T is formed between the bent portion 40b of the reinforcement 40 and the side face of the magnet 30.

In this case, the center of the movement of the side magnet body 50 differs from those of other embodiments and the side magnet body 50 is supported at one side with the outer end of the bent portion 40b as a fulcrum J. The side magnet body 50 is displaced in a direction opposite to that of Embodiment 1 by the moment of centrifugal force applied to the gravity center of the magnet 30. That is, the side magnet body 50 moves to the adjacent side magnet body 50 in a direction that the folded portions 40d of the adjacent reinforcements 40 are brought close to each other, that is, toward the center in a circumferential direction of the claw-like magnetic pole 23 or 24 to reduce the small space U.

The above small space S may not be formed in this case. When the space is formed, the side face 23c or 24c of the claw-like magnetic pole 23 or 24 and the bent portion 40b of the reinforcement 40 may be bonded together by an adhesive, or an elastic material such as a resin maybe placed in the space S and the space S may be smaller than the small space T.

As shown in FIG. 7(b), since the inner side of the side magnet body 50 is displaced in a circumferential direction that the small space U is reduced at the time of the rotation of the rotor 7, the adjacent side magnet body 50 is also displaced in a direction that the small space U is reduced. Then, the folded portions 40d of the reinforcements 40 are contacted to each other and the adjacent side magnet bodies 50 are supported by each other. Thus, unrequired displacement is suppressed, thereby making it possible to improve resistance to centrifugal force at the time of high-speed rotation. Since the reinforcements 40 are contacted to each other, the magnets 30 are not affected. Also, the bent portions 40b of the reinforcements 40 on the claw-like magnetic pole 23 and 24 sides from the fulcrum J as the center of movement are not affected.

Embodiment 4

In the above Embodiment 2, the pressing portion 41c of the reinforcement 41 extends to an intermediate position of the outer face of the magnet 31. In this Embodiment 4, as shown in FIG. 8 and FIGS. 9(a) and 9(b), thin contacting portions 41t and 41t extend to part of the outer face 23b or 24b of the claw-like magnetic pole 23 or 24 from both upper and lower ends of the pressing portion 41c. FIGS. 9(a) and 9(b) are sectional views cut on line B—B and A—A of FIG. 8, respectively.

The contacting portions 41t extend to intermediate positions of chamfered portions 23m or 24m formed at both ends in a circumferential direction of the outer face 23b or 24b of the claw-like magnetic pole 23 or 24 to prevent the reinforcement 41 from falling off from the claw-like magnetic pole 23 or 24 in an inward direction.

This does not require the additional step of processing the claw-like magnetic poles 23 and 24. However, when they are processed for a design reason, they may be processed to a thickness corresponding to the thickness of the contacting portion 41t and its influence upon a magnetic circuit can be ignored. Since part of the contacting portion 41t projects from both ends in an axial direction of the pressing portion 41c of the reinforcement 41, the exposed area of the magnet 31 is secured and coolability is not reduced.

According to this constitution, when the reinforcement 41 and the magnets 31 are to be attached to the claw-like magnetic pole 23 or 24 by an adhesive, they do not need to be held with a jig, thereby making possible a great cost reduction. Also, even when the deterioration of the adhesive with the passage of time is taken into consideration, as the contacting portion 41t and the inner portion 41a of the reinforcement 41 continue to hold the claw-like magnetic pole 23 or 24 and do not lose holding power, a high-reliability and high-quality product can be obtained.

To form the contacting portions in the reinforcement 40, parts of upper and lower ends of the pressing portion 40c may be folded toward the outer face 23b or 24b of the claw-like magnetic pole 23 or 24, or a plate-like contacting piece may be bonded to the pressing portion 40c or 41c.

Embodiment 5

In the above Embodiment 4, the chamfered portions 23m and 24m of the claw-like magnetic poles 23 and 24 are not processed. In this Embodiment 5, as shown in FIG. 10 and FIGS. 11(a) and 11(b), stepped portions 23h and 24h are formed by slightly depressing portions corresponding to the contacting portions 41t and 41t of the chamfered portions 23m and 24m, respectively. The stepped portions 23h and 24h limit the movements in an axial direction of the contacting portions 41t and prevent the reinforcements 41 from falling off from the ends of claw-like magnetic poles 23 and 24. FIGS. 11(a) and 11(b) are sectional views cut on line C—C and A—A of FIG. 10, respectively.

The stepped portions 23h and 24h are formed such that the outer faces 23b and 24b of the claw-like magnetic poles 23 and 24 become almost flush with the contacting portions 41t and 41t when the reinforcements 41 are attached to the claw-like magnetic poles 23 and 24. When the contacting portions 41t and 41t are fitted in the stepped portions 23h and 24h, the reinforcements 41, that is, the magnets 31 are connected to the claw-like magnetic poles 23 and 24 firmly. Therefore, the entire outer surface formed after assembly is a smoothly curved surface which reduces air resistance and does not worsen rotation resistance.

The stepped portions 23h and 24h can be formed by slighting changing the shape of part of each of the chamfered portions 23m and 24m of the claw-like magnetic poles 23 and 24 and do not require separate members to be added. The stepped portions 23h and 24h may be formed with a mold for forming the pole core bodies 21 and 22 or may be formed by processing the chamfered portions 23m and 24m. The stepped portions 23h and 24h can be formed simply by slightly depressing, thereby exerting no magnetic influence upon the claw-like magnetic poles 23 and 24.

As a result, an adhesive for fixing the reinforcement 41 and the magnets 31 to the claw-like magnetic pole 23 or 24 is not necessary, thereby further reducing costs and facilitating production.

Embodiment 6

In the above Embodiment 2, the reinforcements 41 are fixed to the claw-like magnetic poles 23 and 24 by an adhesive alone. In this Embodiment 6, as shown in FIGS. 12(a), 12(b) and 12(c), a ring-form pressing member 60 for pressing the reinforcements 41 against the claw-like magnetic poles 23 and 24 from the inner side is used. This prevents the reinforcements 41 from falling off from the inner sides or end sides of the claw-like magnetic poles 23 and 24. Compared with Embodiments 4 and 5, the reinforcements 41 are attached to the claw-like magnetic poles 23 and 24 more firmly.

After the reinforcements 41 holding the magnets 31 are located at predetermined positions of the claw-like magnetic poles 23 and 24 as shown in FIG. 12(a), the pressing member 60 having such a diameter that it contacts the center portions of the inner portions 41a of the reinforcements 41 is set as shown in FIGS. 12(b) and 12(c). This pressing member 60 has a peripheral surface which is inclined in conformity with the inclination in an axial direction of the inner portion 41a of each of the reinforcements 41 and has high adhesion with a large adhesion area.

Thereby, the pressing member 60 can hold the reinforcements 41 firmly while the reinforcements 41 are attached to the claw-like magnetic poles 23 and 24, and the AC generator can be carried without a trouble after assembly. A plurality of the reinforcements 41 can be fixed to the claw-like magnetic poles 23 and 24 at the same time and the structure of the reinforcement 41 can be made simple. The pressing member 60 are made from a metal or plastic and may have a rectangular cross section.

When an adhesive is coated to the claw-like magnetic pole 23 or 24 and the reinforcement 41, adhesion surfaces are brought close to each other, thereby making it unnecessary to hold the reinforcements 41 and the claw-like magnetic poles 23 and 24 excessively and securing sufficient adhesion strength. When the plurality of reinforcements 41, the magnets 31 and the pressing member 60 are held by a jig at the time of assembly and connected to the claw-like magnetic poles 23 and 24, fixing by the adhesive is not necessary.

The pressing member 60 may be used for the reinforcements 40. In this case, the inner portions 40a of the reinforcements 40 are pressed by the pressing member 60.

Embodiment 7

In the above Embodiment 6, the peripheral surface of the pressing member 60 contacts the inner portions 40a and 41a of the reinforcements 40 and 41. In this Embodiment 7, as shown in FIG. 13 and FIG. 14, a ring-form pressing member 70 has a cylindrical peripheral surface 70b conformed to the peripheral surface of the rotor 7 and grooves 70m in which the claw-like magnetic poles 23 and 24 held in the reinforcements 40 are fitted are formed in the peripheral surface 70b. As shown in FIG. 14, when the rotor 7 is assembled, the peripheral surface of the rotor 7 forms an almost completely cylindrical curved surface together with the outer faces 23b and 24b of the claw-like magnetic poles 23 and 24.

As shown in FIG. 13, there is a space between the inner wall of the pressing member 70 and the rotor coil 13 and cooling air 70F passes through the space to cool the rotor 7.

Since the reinforcements 40 are thereby pressed from the inner side to the outer side by the pressing member 70 having a large width in an axial direction, they can be connected to the claw-like magnetic poles 23 and 24 more firmly than in Embodiment 6. Further, even when the rotor 7 has a plurality of magnets 30, it has the effect of preventing wind sound from getting worse by rotation because it has a cylindrical curved peripheral surface 70b. The pressing member 70 is wide enough to cover the ends of the claw-like magnetic poles 23 and 24 but may be wide enough to extend to the end surfaces of the base portions 21k and 22k of the pole core bodies 21 and 22.

Embodiment 8

In this Embodiment 8, as shown in FIGS. 15(a) and 15(b), the inclination angles of the side faces 23c and 24c of the claw-like magnetic poles 23 and 24 are set such that the outer faces 23b and 24b of the claw-like magnetic poles 23 and 24 become wider than the inner faces 23a and 24a. The reinforcements 40 and 41 are formed in conformity with the side faces 23c and 24c which are inclined more.

Thereby, the ends on the inner sides of the magnets 30 and 31 are hardly seen from a circumferential direction and the magnets 30 and 31 are arranged as if they were hidden on the inner face 23a and 24a sides of the claw-like magnetic poles 23 and 24.

In this case, centrifugal force 30E or 31E applied to the magnet 30 or 31 is divided into two segments. That is, resistance 30K or 31K applied to the side face 23c or 24c in a vertical direction increases and dispersion force applied to the side face 23c or 24c in a horizontal direction decreases. Therefore, the centrifugal force resistance of the side magnet body 50 or 51 is improved.

Embodiment 9

In this Embodiment 9, as shown in FIG. 16, the root portion 30n or 31n of the magnet 30 or 31 is made thicker than the end portion 30s or 31s when seen from the cross section in a circumferential direction of the claw-like magnetic pole 23 or 24. In the figure, the reinforcements 40 and 41 are omitted and the shapes of the magnets 30 and 31 are shown when seen from the cross section in a circumferential direction of the claw-like magnetic pole 23 or 24.

That is, the gravity center of the magnet 30 or 31 is located closer to the root side rather than the end side of the claw-like magnetic pole 23 or 24, that is, to the base portion 21k or 22k of the pole core body 21 or 22. Thereby, the displacement of the end portion of the claw-like magnetic pole 23 or 23 which is moved by magnetic attraction force or centrifugal force generated by the rotation of the rotor 7 can be reduced. That is, force influencing the magnet 30 or 31 can be reduced.

As having been described above, according to the first aspect of the present invention, the rotor structure comprises a rotor coil for generating a magnetic flux, a pole core which covers the rotor coil and consists of a first pole core body and a second pole core body, each having a plurality of claw-like magnetic poles which are mated with each other, magnets provided on both sides of each claw-like magnetic pole to suppress the leakage of a magnetic flux between the side faces of adjacent claw-like magnetic poles, and reinforcements for holding the magnets in such a manner that the magnets are inclined so that the interval between the magnets becomes larger on the outer side than on the inner side. Therefore, the magnets can be fixed to each claw-like magnetic pole without fail while they are surrounded by the reinforcement, the strength of a side magnet body composed of the magnet and portions holding the magnet of the reinforcement can be enhanced without taking some measure for the magnets, and the centrifugal force resistance thereof is high.

According to the second aspect of the present invention, the reinforcement consists of an inner portion conformed to the inner face of the claw-like magnetic pole, bent portions bent from both ends of the inner portion toward the side faces of the claw-like magnetic pole, pressing portions, bent from the bent portions, for pressing the outer faces of the magnets, and folded portions folded from the pressing portions toward the side faces of the magnets, and the magnets are held on the inner side of the reinforcement. Therefore, as the reinforcement is easily manufactured at a low cost, has high strength and is formed continuous on the inner face and the side faces of the claw-like magnetic pole, it can receive centrifugal force and moving force applied to the claw-like magnetic pole with the entire surface from the inner side and can reduce force affecting the magnets.

According to the third aspect of the present invention, the reinforcement consists of an inner portion conformed to the inner face of the claw-like magnetic pole and the inner faces of the magnets, bent portions bent from both ends of the inner portion toward the side faces of the magnets, and pressing portions, projecting from the bent portions toward the claw-like magnetic pole, for pressing the outer faces of the magnets, and the magnets are held on the outer side of the reinforcement. Therefore, as the reinforcement can be easily manufactured at a low cost and is formed continuous on the inner face of the claw-like magnetic pole and the inner faces of the magnets, it can receive centrifugal force and moving force applied to the claw-like magnetic pole with the entire surface from the inner side and can reduce force affecting the magnets.

According to the fourth aspect of the present invention, since the magnet and portions holding the magnet of the reinforcement constitute a side magnet body, a space is formed between the side magnet body and the side face of the claw-like magnetic pole, the side magnet body moves toward the claw-like magnetic pole to reduce the space when centrifugal force is applied to the magnet, and the reinforcement is deformed by this moving force to absorb the centrifugal force. Therefore, even when centrifugal force is generated by the rotation of the rotor, the side magnet body moves and displaces toward the center direction of the claw-like magnetic pole so that it holds the claw-like magnetic pole, whereby the holding power of the reinforcement is strengthened and the centrifugal force resistance thereof is high.

According to the fifth aspect of the present invention, the center of the movement of the side magnet body is located on the claw-like magnetic pole side of the line connecting the center of the rotation axis of the rotor and the gravity center of the magnet, and the movement of the side magnet body is stopped when it contacts the side face of the claw-like magnetic pole. Therefore, even if centrifugal force increases, the side magnet body is firmly fixed, further displacement can be suppressed, centrifugal force is not applied to the magnet, and the centrifugal force resistance of the side magnetic body is high.

According to the sixth aspect of the present invention, the magnet is held by the pressing portion and the folded portion and constitutes a side magnet body together with the pressing portion and the folded portion, a space is formed between the side magnet body and the side face of the claw-like magnetic pole, a space is formed between adjacent side magnet bodies, the side magnet body moves toward the adjacent side magnetic body to reduce the space between the adjacent side magnet bodies when centrifugal force is applied to the magnet, the reinforcement is deformed by this moving force to absorb the centrifugal force, and the movement of the side magnet body is stopped when the adjacent folded portions contact each other. Therefore, even when centrifugal force increases, the side magnet body is firmly fixed, further displacement can be suppressed, centrifugal force is not applied to the magnet, and the centrifugal force resistance of the side magnet body is high.

According to the seventh aspect of the present invention, the space between the side magnet body and the side face of the claw-like magnetic pole is set such that the deformed reinforcement can restore its original shape when centrifugal force is not applied to the magnet after the movement of the side magnet body is stopped and the deformation amount of the reinforcement becomes maximum. When centrifugal force is applied again, the side magnet body can move and the reinforcement can move repeatedly without being broken.

According to the eighth aspect of the present invention, the space between the side magnet body and the side face of the claw-like magnetic pole is set such that stress applied to the reinforcement falls below at least an allowable level when the movement of the side magnet body is stopped and the deformation amount of the reinforcement becomes maximum. Even when the side magnet body moves and displaces maximum, the deformation amount of the reinforcement falls below the allowable level and the reinforcement is not broken by excessive stress.

According to the ninth aspect of the present invention, since an elastic material is placed in the space between the side magnet body and the side face of the claw-like magnetic pole, foreign matter is not contained in the space or impact force to the claw-like magnetic pole can be alleviated at the time of the displacement of the side magnet body.

According to the tenth aspect of the present invention, since the rotor structure has a stopping structure for preventing the reinforcement from falling off from the claw-like magnetic pole in an inward direction, the reinforcement is connected to the claw-like magnetic pole more firmly, the magnet is not scattered and not damaged, and the reinforcement does not fall off in an inward direction even when the pole core body fitted with the reinforcements is placed horizontally in an axial direction. Therefore, the rotor structure has excellent work efficiency that it can be freely carried and set.

According to the eleventh aspect of the present invention, since the rotor structure has a stopping structure for preventing the reinforcement from falling off from the claw-like magnetic pole in an outward direction, the reinforcement is connected to the claw-like magnetic pole more firmly, the magnet is not scattered and not damaged, the reinforcement does not fall off from the claw-like magnetic pole in an axial direction, and the pole core bodies fitted with the reinforcements can be easily mated with each other with the rotor coil contained therein.

According to the twelfth aspect of the present invention, since the rotor structure has a stopping structure for preventing the reinforcement from falling off from the claw-like magnetic pole in inward and outward directions, the movement of the reinforcement in an inward direction and axial direction with respect to the claw-like magnetic pole can be limited with a simple structure without fail and the holding function of the structure is high.

According to the thirteenth aspect of the present invention, since the above stopping structure is contacting portions which project from the reinforcement and contact the outer face of the claw-like magnetic pole, they have the effect of holding the chamfered portions of the claw-like magnetic pole and preventing the reinforcement from falling off from the claw-like magnetic pole in an inward direction with a simple structure.

According to the fourteenth aspect of the present invention, since a pressing member for pressing the reinforcements against the claw-like magnetic poles from the inner side is used as the stopping structure, the movement of the reinforcements in an inward direction, axially inward direction and axial direction with respect to the claw-like magnetic poles is limited, and pressing force can be applied to the reinforcements so that the reinforcements are pressed against the claw-like magnetic poles from the inner side.

According to the fifteenth aspect of the present invention, the above pressing member has a cylindrical peripheral surface, grooves in which the claw-like magnetic poles held in the reinforcements are fitted in are formed in the peripheral surface, and the outer faces of the claw-like magnetic poles and the peripheral surface of the pressing member form the cylindrical curved peripheral surface of the rotor. Therefore, the movement of the reinforcements in an inward direction, axially inward direction and axial direction with respect to the claw-like magnetic poles is limited with more certainty, and the entire peripheral surface of the rotor becomes a smoothly curved surface, thereby reducing wind sound generated at the time of the rotation of the rotor.

According to the sixteenth aspect of the present invention, since the side faces of the claw-like magnetic pole are inclined such that the interval between them becomes larger on the outer side than on the inner side, resistance applied to the side faces of the claw-like magnetic pole vertically increases and centrifugal force applied to the magnet alone decreases, thereby increasing the centrifugal force resistance of the side magnet body.

According to the seventeenth aspect of the present invention, since the gravity center of the magnet is located close to the root side of the claw-like magnetic pole, even when the end of the claw-like magnetic pole moves at the time of the rotation of the rotor, the amount of this movement can be reduced.

According to the eighteenth aspect of the present invention, since the reinforcement is made from a metal, it has a high degree of machining freedom and can be manufactured at a low cost.

According to the nineteenth aspect of the present invention, since the reinforcement is welded to the claw-like magnetic pole, it can be firmly connected to the claw-like magnetic pole.

According to the twentieth aspect of the present invention, since the reinforcement has a stopping structure for preventing the magnets from falling off toward the end side or root side of the reinforcement, the magnets can be prevented from falling off from the reinforcement.

What is claimed is:

1. A rotor structure comprising:
   a rotor coil for generating a magnetic flux;
   a pole core which covers the rotor coil and consists of a first pole core body and a second pole core body, each having a plurality of claw-like magnetic poles which are mated with each other;
   magnets provided on both sides of each claw-like magnetic pole to suppress the leakage of a magnetic flux between the side faces of adjacent claw-like magnetic poles; and
   reinforcements for holding the magnets in such a manner that the magnets are inclined so that the interval between the magnets becomes larger on the outer side than on the inner side.

2. The rotor structure of claim 1, wherein each of the reinforcements consists of an inner portion conformed to the inner face of the claw-like magnetic pole, bent portions bent from both ends of the inner portion toward the side faces of the claw-like magnetic pole, pressing portions, bent from the bent portions, for pressing the outer faces of the magnets, and folded portions folded from the pressing portions toward the side faces of the magnets, and the magnets are held on the inner side of the reinforcement.

3. The rotor structure of claim 2, wherein the magnet and portions holding the magnet of each of the reinforcements constitute a side magnet body, a space is formed between the side magnet body and the side face of the claw-like magnetic pole, the side magnet body moves toward the claw-like magnetic pole to reduce the space when centrifugal force is applied to the magnet, and each of the reinforcements is deformed by this moving force to absorb the centrifugal force.

4. The rotor structure of claim 3, wherein the center of the movement of the side magnet body is located on the claw-like magnetic pole side of a line connecting the center of the rotation axis of the rotor and the gravity center of the magnet, and the movement of the side magnet body is stopped when it contacts the side face of the claw-like magnetic pole.

5. The rotor structure of claim 3, wherein the space between the side magnet body and the side face of the claw-like magnetic pole is set such that each of the deformed reinforcements can restore its original shape when centrifugal force is not applied to the magnet after the movement of the side magnet body is stopped and the deformation amount of the reinforcement becomes maximum.

6. The rotor structure of claim 3, wherein the space between the side magnet body and the side face of the claw-like magnetic pole is set such that stress applied to each of the reinforcements falls below at least an allowable level when the movement of the side magnet body is stopped and the deformation amount of each of the reinforcements becomes maximum.

7. The rotor structure of claim 3, wherein an elastic material is placed in the space between the side magnet body and the side face of the claw-like magnetic pole.

8. The rotor structure of claim 2, wherein the magnet is held by the pressing portion and the folded portion and constitutes a side magnet body together with the pressing portion and the folded portion, a space is formed between the side magnet body and the side face of the claw-like magnetic pole, a space is formed between adjacent side magnet bodies, the side magnet body moves toward the adjacent side magnetic body to reduce the space between the adjacent side magnet bodies when centrifugal force is applied to the magnet each of, the reinforcements is deformed by this moving force to absorb the centrifugal force, and the movement of the side magnet body is stopped when the adjacent folded portions contact each other.

9. The rotor structure of claim 1 which has a stopping structure for preventing each of the reinforcements from falling off from the claw-like magnetic pole in an inward direction.

10. The rotor structure of claim 9, wherein the stopping structure has contacting portions which project from each of the reinforcements and contact the outer face of the claw-like magnetic pole.

11. The rotor structure of claim 9, wherein a pressing member for pressing the reinforcements against the claw-like magnetic poles from the inner side is used as the stopping structure.

12. The rotor structure of claim 11, wherein the pressing member has a cylindrical peripheral surface, grooves in which the claw-like magnetic poles held in the reinforcements are fitted are formed in the peripheral surface, the outer faces of the claw-like magnetic poles and the peripheral surface of the pressing member form the cylindrical curved peripheral surface of the rotor.

13. The rotor structure of claim 1 which has a stopping structure for preventing each of the reinforcements from falling off from the claw-like magnetic pole in an outward direction.

14. The rotor structure of claim 1 which has a stopping structure for preventing each of the reinforcements from falling off from the claw-like magnetic pole in inward and outward directions.

15. The rotor structure of claim 1, wherein the side faces of the claw-like magnetic pole are inclined such that the interval between them becomes larger on the outer side than on the inner side.

16. The rotor structure of claim 1, wherein the center of gravity of the magnet is located close to the root side of the claw-like magnetic pole.

17. The rotor structure of claim 1, wherein each of the reinforcements is made from a metal.

18. The rotor structure of claim 17, wherein each of the reinforcements is welded to the claw-like magnetic pole.

19. The rotor structure of claim 1, wherein each of the reinforcements consists of an inner portion conformed to the inner face of the claw-like magnetic pole and the inner faces of the magnets, bent portions bent from both ends of the inner portion toward the side faces of the magnets, and pressing portions, projecting from the bent portions toward the claw-like magnetic pole, for pressing the outer faces of the magnets, and the magnets are held on the outer side of the reinforcement.

20. The rotor structure of claim 1, wherein each of the reinforcements has a stopping structure for preventing the magnets from falling off toward the end side or root side of the reinforcement.

* * * * *